O. G. VOLD.
SEED CORN DRIER.
APPLICATION FILED MAY 7, 1917.
1,254,378. Patented Jan. 22, 1918.
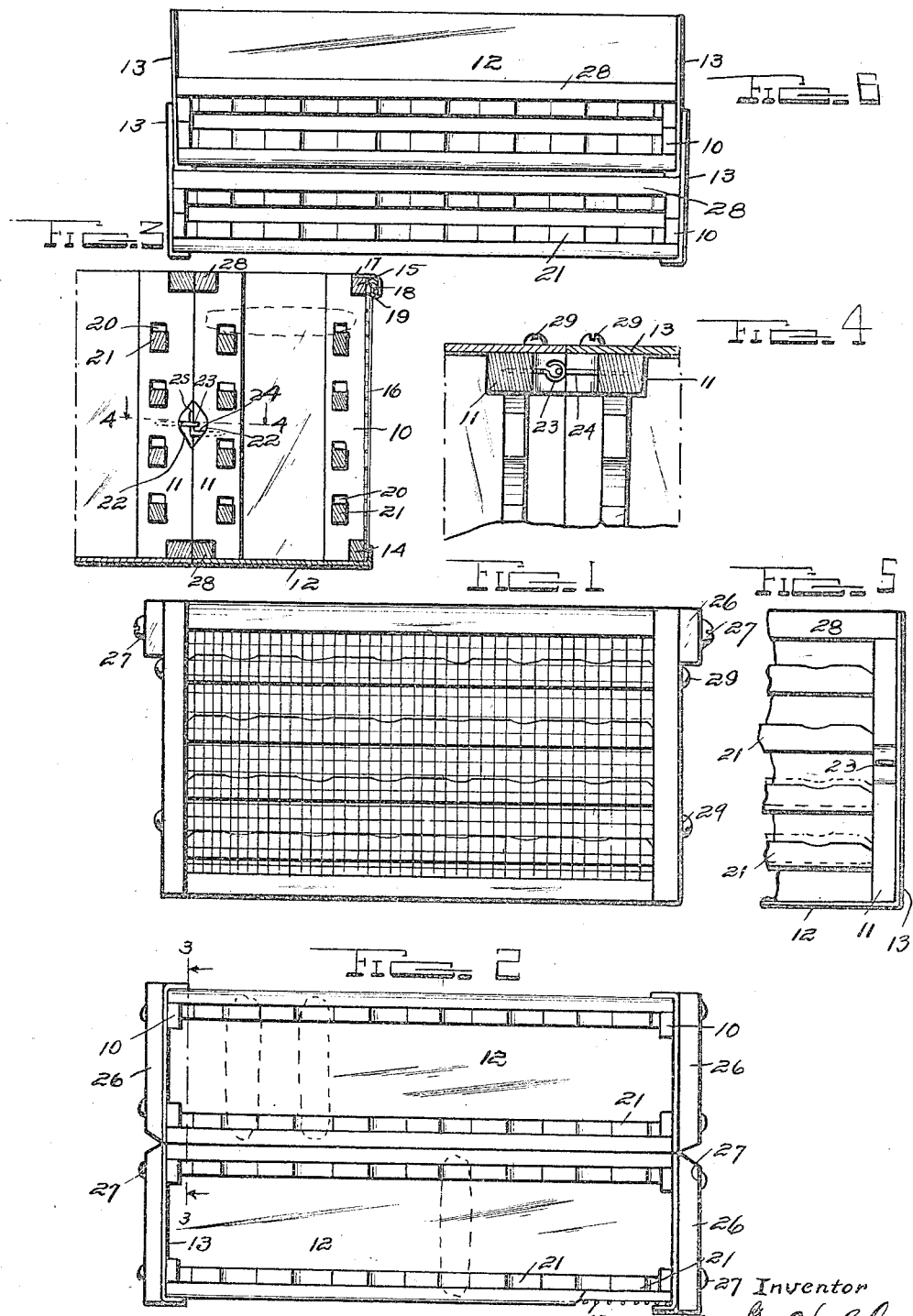

UNITED STATES PATENT OFFICE.

OLE G. VOLD, OF FOREST CITY, IOWA.

SEED-CORN DRIER.

1,254,378.    Specification of Letters Patent.   Patented Jan. 22, 1918.

Application filed May 7, 1917. Serial No. 167,115.

*To all whom it may concern:*

Be it known that I, OLE G. VOLD, a citizen of the United States, and resident of Forest City, in the county of Winnebago and State of Iowa, have invented a certain new and useful Seed-Corn Drier, of which the following is a specification.

My invention relates to racks for stacking, preserving and drying seed corn.
The object of my invention is to provide such a rack of simple, durable and inexpensive construction.

A further object is to provide such a rack preferably made in sections, whereby the racks may be arranged and secured together side by side for reducing the amount of material and the expense of construction, and whereby the racks may be so constructed and connected together as to be rat and mouse proof.

A further object is to provide such a seed corn rack made in sections, which, by slight adjustment, may be collapsed and nested for reducing the space occupied by the sections during storage or transportation.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a front elevation of a seed corn rack embodying my invention.

Fig. 2 shows a top or plan view of a two-section rack, of the type shown in Fig. 1.

Fig. 3 shows a vertical, sectional view taken on the line 3—3 of Fig. 2.
Fig. 4 shows a horizontal, sectional view taken on the line 4—4 of Fig. 3.

Fig. 5 shows a detail view of part of one of the rack sections, and

Fig. 6 shows a front elevation of two of the sections collapsed and nested resting upon their sides.

In the illustration of my invention shown in the accompanying drawings, I have shown a seed corn rack comprised of two sections, each section is formed with what I shall call the outer upright corner members indicated by the reference character 10 and the inner upright corner members 11.

Secured to the outer corner members is a sheet metal box 12 upon which the inner corner members 10 rest. Secured to the outer corner members and to the bottom are upright sheet metal end members 13.

Connecting the outer corner members 10 at their lower ends are longitudinal frame members 14, and connected with said same corner members at their upper ends are longitudinal frame members 15.

The front or outer side wall of each section is made of reticulated material such as meshed wire 16 preferably secured at its lower end to the frame member 14 and to the bottom 12. Secured to the upper surface of the frame members 15 is a strip of metal 17 extending outwardly beyond the member 15 and thence bent downwardly at 18 and thence upwardly at 19, forming between the portion 18 and the member 15 an upwardly opening channel. The upper edge of the wire screen wall 16 is extended upwardly between the member 15 and the portion 18 and is then bent downwardly in the channel just described.

The upright frame corner members 10 and 11 are each provided with a vertical series of slots 20. The slots 20 of the members 10 are arranged in opposite pairs as are the slots 20 of the members 11.

The pairs of slots of the members 10 are horizontally opposite the pairs of slots of the members 11.

Mounted between the members 10 and also between the members 11 are supporting strips 21 or bars for ears of corn having their ends received in the slots 20. The ends of said strips or bars 21 are narrower from top to bottom than the slots 20 so as to permit some vertical adjustment of the strips or bars 21 in the slots 20, as illustrated in Fig. 3.

The bars 20 are preferably provided in their upper surfaces with notches 21 to receive ears of corn. It will be seen that when the ears of corn are placed in position, the bars 21, except the lower bars 21, may be raised slightly, if there should happen to be extra large ears between any successive pairs of bars. Thus the bars 21 may be readily and easily adjusted during the placing of the ears of corn in the rack for accommodating ears of corn which may vary slightly in size.

It will readily be understood that the position of the bars 21 may be inverted so as to make the bottom 12 the top of the rack, where this is desired. The racks are preferably used in pairs with the open side adjacent to each other, as shown in Figs. 2 and 3.

The upright corner members 11 of one section of each pair are provided with notches 22 in which are secured screw-eyes 23. The upright corner members 11 of the other section of each pair of sections are provided with small notches 22 in which are mounted rods 24.

The rods 24 are provided at their free ends with vertical extensions 25 so arranged that at one end of the rack said extensions 25 extend downwardly, and at the other end upwardly.

The extensions 25 are designed to be received in the screw-eyes 23, as illustrated in Figs. 3 and 4.

I preferably secure to the upper outer surface of the end members 13 at each end of each rack section, a cross bar 26 by means of screws 27, which may extend into the members 10 and 11.

The cross bars 26 serve as handles and the adjacent ends of the cross bars 26 on the respective sections of each rack are beveled, as shown, at 27, so that when the sections of a complete rack are being assembled together they may be swung slightly on the members 25 and 22 as pivots.

Any suitable cover may be used for my improved racks or a series of the racks may be stacked and the upper rack may be inverted for making a completely mouse and rat proof rack and drier for the corn.

The members 11 of each section are connected at their upper and lower ends by longitudinal frame members 28, and are secured to the ends by screws 29.

In the practical use of my improved seed corn rack, each section is filled with ears of corn from its open side. The ears of corn are placed on the bars 21 until each section is filled. The sections are then fastened together by means of the screw-eyes and the members 25.

When it is desired to collapse and nest the sections for stacking and transportation, the screws 29 are removed for permitting the removal of the bars 26, and thereupon each section may be raised on its side and the frame comprised of the members 11 and 28 and the bars 21 may be dropped downwardly, as illustrated in Fig. 6. By the arrangement of the parts, just mentioned, it is possible to stack my improved seed corn racks in considerably less space than would otherwise be possible.

By making the racks in twin sections, as herein described, I am able to very greatly reduce the expense of manufacture by doing away with the necessity of a closed side for each section, and yet the ears may be readily and easily placed in the sections.

Some changes may be made in the construction and arrangement of the various parts of my improved rack without departing from the essential spirit and purposes of my invention, and it is my intention to cover by my present application any modified forms of structure which may be reasonably included within the scope of my claims.

I claim as my invention:

1. A seed corn rack having sections, each section being provided with a bottom and ends and a side wall, a frame for each section adapted to be opposite said side walls, means for securing said frame to said ends, said frame being adapted when said last means are inoperative to slide laterally within the section, and means for locking the assembled sections together with their open sides adjacent to each other.

2. A seed corn rack, having sections, each provided with a bottom and end walls, and side walls arranged to permit the free passage of air, vertically adjustable means within each section for supporting ears of corn loosely supported so as to be movable upwardly to accommodate large ears, and means for locking together the sections with their open sides adjacent to each other.

3. A seed corn rack having sections, formed with a bottom, end members and side walls, adapted to permit the free passage of air, a frame adjacent to the side wall of each section having upright corner members, corn supporting bars mounted on said corner bars for limited vertical adjustment, a second frame comprising upright corner members, corn supporting bars mounted on said second described upright corner members for limited vertical adjustment, means for securing said second frame in position opposite said first frame, said second frame being adapted when said last means is inoperative to slide toward or from said first frame within its section, said end members being made of somewhat resilient material.

4. A seed corn rack having sections, said sections each having a bottom, ends and side walls to permit the free passage of air, a frame adjacent to said side walls, means supported by said frame for supporting ears of corn, a second frame capable of sliding movement within said sections toward and from said first frame, means supported by said second frame for holding ears of corn, means for securing said second frame in position spaced from said first frame, and means for locking together the second frames of a pair of said sections, the parts being so arranged that when the means for holding the second frames spaced from the first frames are inoperative and the second frames are moved toward the first frame one side of one section may be inserted into the opposite side of another section.

Des Moines, Iowa, April 30, 1917.

OLE G. VOLD.